United States Patent
Csaszar et al.

(10) Patent No.: US 8,446,826 B2
(45) Date of Patent: May 21, 2013

(54) CONGESTION HANDLING IN A PACKET SWITCHED NETWORK DOMAIN

(75) Inventors: Andras Csaszar, Budapest (HU); Attila Takacs, Budapest (HU); Attila Bader, Paty (HU); Robert Szabo, Budapest (HU); Lars Westberg, Enkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 294 days.

(21) Appl. No.: 11/718,854

(22) PCT Filed: Nov. 12, 2004

(86) PCT No.: PCT/SE2004/001657
§ 371 (c)(1),
(2), (4) Date: May 8, 2007

(87) PCT Pub. No.: WO2006/052174
PCT Pub. Date: May 18, 2006

(65) Prior Publication Data
US 2007/0268827 A1    Nov. 22, 2007

(51) Int. Cl.
*H04L 12/26*    (2006.01)
(52) U.S. Cl.
USPC .......................................... 370/232; 709/235
(58) Field of Classification Search
USPC .............. 370/229, 230, 230.1, 231, 232, 233, 370/234, 235, 236, 237, 241, 252, 253; 709/230, 709/232, 233, 234, 235
See application file for complete search history.

(56) References Cited

U.S. PATENT DOCUMENTS

| | | | | |
|---|---|---|---|---|
| 5,612,949 A * | 3/1997 | Bennett | | 370/253 |
| 6,424,624 B1 * | 7/2002 | Galand et al. | | 370/231 |
| 6,657,962 B1 | 12/2003 | Barri et al. | | |
| 2002/0089931 A1 * | 7/2002 | Takada et al. | | 370/232 |
| 2003/0235171 A1 * | 12/2003 | Lundstrom et al. | | 370/338 |
| 2004/0042398 A1 | 3/2004 | Peleg et al. | | |
| 2004/0085983 A1 * | 5/2004 | Bass et al. | | 370/412 |
| 2004/0090917 A1 * | 5/2004 | Ruutu et al. | | 370/235 |
| 2004/0100901 A1 * | 5/2004 | Bellows | | 370/230 |
| 2004/0114576 A1 * | 6/2004 | Itoh et al. | | 370/352 |
| 2005/0033859 A1 * | 2/2005 | Karsten | | 709/233 |
| 2005/0047340 A1 * | 3/2005 | Babiarz et al. | | 370/231 |
| 2005/0169253 A1 * | 8/2005 | Hu | | 370/352 |

FOREIGN PATENT DOCUMENTS

| | | |
|---|---|---|
| GB | 2395856 A | 6/2004 |
| WO | WO 0207381 A1 | 1/2002 |
| WO | WO 02/076035 A | 9/2002 |
| WO | WO 03/065644 A | 8/2003 |

OTHER PUBLICATIONS

Ramakrishnan, K., "A Proposal to add Explicit Congestion Notification (ECN) to IP", Request for Comments 2481, Jan. 1999.*

(Continued)

*Primary Examiner* — Yemane Mesfin
*Assistant Examiner* — Khoa Huynh (57) ABSTRACT

A system and a method are described herein which provide for congestion handling in a packet switched network domain. In case of congestion, overload is measured by a core node, the data packets in proportion to the overload are marked and the signaled overload is stored. At least one egress node receives marked and not marked packets, decodes and counts the overload from the marked packets in a counting interval. Congestion report messages are sent to ingress nodes where flows are terminated.

8 Claims, 6 Drawing Sheets

OTHER PUBLICATIONS

R. Braden, et al: "Resource Reservation Protocol (RSVP) Version 1 Functional Specification". RFC 2205. Sep. 1997.

R. Braden, et al: "Integrated Services in the Internet Architecture: an Overview", RFC 1633. 1994.

J. Wroclawski, et al: "The Use of RSVP with IETF Integrated Services", RFC 2210, Sep. 1997.

S. Blake, et al: "An Architecture for Differentiated Services", RFC 2475. 1998.

L. Westberg, et al: "Resource Management in Diffserv (RMD): A Functionality and Performance Behavior Overview", Protocols for High Speed Networks 7$^{th}$ IFIP/IEEE International Workshop, PfHSN 2002, Berlin. Germany, Apr. 22-24.

Proceedings Series: Lecture Notes in Computer Science, vol. 2334 Carle. Georg; Zitterbart, Martina (Eds.) 2002, X, 280 pp., Softcover ISBN: 3-540-43658-8.

3GPP TSG RAN: "IP Transport in UTRAN Work Task Technical Report" 3GPP TR 25.933. 2003.

Patrick Goering: "IPv6 based—On Demand Resource Management in Diffserv (RMD)" Master of Science Thesis, 'Online! Aug. 14, 2003. pp. 1-100. XP002332843 University of Twente, The Netherlands Retrieved from the Internet: URL:http://dacs.cs.utwente.nl/assignments/completed/thesis_patrick_goering.pdf> 'retrieved on Jun. 20, 2005! p. 13, paragraph 2.4.3-p. 17, paragraph 3. p. 22, paragraph 3.1.3.1-p. 29, paragraph 3.2.2.1.

Andras Csaszar, Attila Takacs, Robert Szabo. Vlora Rexhepi, and Georgios Karagiannis: "Severe congestion handling with resource management in diffserv on demand" Proceedings of Networking 2002, The Second Intl. IFIP-TC6 Netowrking Conference, vol. 2345 of Lecture Notes in Computer Science. 'Online! vol. 2345, May 2002, pp. 443-454. XP002332844 Pisa. Italy Retrieved from the Internet URL:http://qosip.tmit.bme.hu/{csaszar/csata-pdf/rmd-networking2002.pdf> 'retrieved on Jun. 20, 2005! p. 3, paragraph 3.1-p. 7, paragraph 4.

Karsten M et al: "Admission Control based on Packet Marking and Feedback Signalling—Mechanisms, Implementation and Experiments" Multimedia Communications Lab, Darmstadt University of Technology, May 2002 Darmstadt, Germany, the whole document.

Almesberger, W.; Giordano, S.; Mameli, R.; Salsano, S.; Salvatore, F.: "A Prototype Implementation for the IntServ Operation over DiffServ Networks" Globecom 2000, vol. 1. 'Online! May 2000, pp. 1-6. San Fransisco, US, the whole document.

* cited by examiner

CONGESTION HANDLING IN A PACKET SWITCHED NETWORK DOMAIN

BACKGROUND OF THE INVENTION

1. Technical Field of the Invention

The invention relates in general to congestion handling of a packet switched network domain. In particular, and not by way of limitation, the present invention is directed to congestion handling in an Internet Protocol (IP) network domain.

2. Description of Related Art

Recently, IP-based transport solutions are considered for 3rd generation (3G) networks because of the flexibility and wide deployment of IP technologies. These networks have different characteristics when compared to traditional IP networks requiring fast dynamic resource reservation, simplicity, low costs, severe congestion handling, and good scalability properties. Besides, 3G networks have strict Quality of Service (QoS) requirements. Traffic congestion control is thus an important consideration in communications networks. One method of network management that may be suitable for use in future networks, is the so called policy-enabled networking. An example of the policy-enabled networking is QoS provisioning using the so-called 'DiffServ' architecture. 'DiffServ' refers to the IP Differentiated Service architecture, where QoS provisioning is obtained by marking data units. Different marked packets will receive a different priority in queuing and/or scheduling of nodes.

The Internet Engineering Task Force (IETF) has specified resource reservation signaling protocols, such as RSVP [R. Braden et al.: "Resource ReSerVation Protocol (RSVP)—Version 1 Functional Specification", RFC 2205, September 1997], and different QoS models, such as Integrated Services [R. Braden, et al.: "Integrated Services in the Internet Architecture: an Overview", RFC 1633, 1994], [J. Wroclawski: "The Use of RSVP with IETF Integrated Services", RFC 2210, September 1997] or Differentiated Services [S. Blake, et al.: "An Architecture for Differentiated Services", RFC 2475, 1998], for providing QoS in an IP network. In the Next Steps In Signaling (NSIS) Working Group (WG) of IETF a new QoS signaling protocol, aiming to meet the requirements of 3G networks and different real time applications, is under development.

The future NSIS protocol will support different QoS models and operation modes including Resource Management in Differentiated Services (RMD) [L. Westberg et. al.: "Resource Management in Diffserv (RMD): A Functionality and Performance Behavior Overview", Protocols for High Speed Networks 7th IFIP/IEEE International Workshop, PfHSN 2002, Berlin, Germany, Apr. 22-24, 2002. Proceedings Series: Lecture Notes in Computer Science, Vol. 2334 Carle, Georg; Zitterbart, Martina (Eds.) 2002, X, 280 pp., Softcover ISBN: 3-540-43658-8], patent publication WO2002076035A1]. RMD is a scalable and dynamic resource reservation method based on DiffServ and it is able to work together with standard IP routing protocols. This allows fast re-routing in case of link or node failure, which is one of the major advantages of IP networks comparing to other transport technologies such as AAL2/ATM [3GPP TSG RAN: "IP Transport in UTRAN Work Task Technical Report" 3GPP TR 25.933, 2003].

In RMD scalability is achieved by separation of the complex per domain reservation mechanism from the simple reservation mechanism needed for a node. Complex functions are performed at edge nodes and core nodes are involved only in simple operations. In such a system edge nodes perform complex operation and store per-flow information while core nodes in the domain perform simple operation and do not store per-flow states. In such a resource management system, two basic operation modes can be distinguished: normal operation and fault handling. Normal operation includes making a new reservation, refresh reservations, and tear down reservations. Fault handling is needed if quality-of-service sensitive flows experience service degradation due to congestion. Basic features of normal operation and fault handling operation modes are described in A. Császár et al.: "Severe Congestion Handling with Resource Management in DiffServ on Demand", In proc. of the Second International IFIP-TC6 Networking Conference, Networking 2002, pp. 443-454, May 2002, Pisa, Italy.

Severe congestion is considered as an undesirable state, which may occur as a result of a route change. Typically, routing algorithms are able to adapt and change their routing decisions to reflect changes in the topology (e.g., link failures) and traffic volume. In such situations the re-routed traffic will have to follow a new route. Nodes located on this new path may become overloaded, since they suddenly might need to support more traffic than their capacity. The resource management protocol in reaction to severe congestion has to terminate some flows on the congested path in order to ensure proper QoS for the remaining flows.

Congestion occurrence in the communication path has to be notified to the edge nodes of the affected flows, since core nodes do not have per flow identification. The congestion handling control loop consists of the following steps: (1) A core node that detects congestion marks passing packets, which are forwarded to an egress node. This way, (2) the egress node learns the overload ratio and decides accordingly which flows should be dropped. For these flows the egress node generates and (3) sends a report to an ingress node to reduce the traffic volume injected by the ingress node. This signal could be a RSVP tear down message or error message or NSIS response or any other kind of message describing the overflow of traffic volume. Upon reception of this signalling packet, (4) the ingress nodes terminate the appropriate flows.

The congestion algorithm described above and which is used also in the original RMD concept over-reacts congestion events terminating more flows than necessary to cease congestion. This effect can be seen as an "undershoot" in the link utilization graph of the affected links.

The reason of the over-reaction is the delayed feedback of the overload situation. After detecting the congestion situation, the core node notifies the egress nodes by marking data packets that pass through the node so that the sum size of the marked packets compared to all forwarded bytes is proportional to the overload. When the marked packets arrive at the egress node, it summarizes the size of marked and unmarked packets. Based on these two counters, the egress node calculates the overload ratio and decides which flow or flows to terminate. The core nodes do not have per flow information and they cannot have information about the previously marked packets per flow. In case of congestion they continue marking the packets until the measured utilization falls below the threshold. Since marking is done in core nodes, the decision is made at the egress node, and termination of flows are done in ingress node there is a delay between these events. In the ingress node the number of terminated flows is determined by previously marked packets. Thus, it can happen that there is no congestion any longer in the core node but the ingress node still terminates a number of flows determined in a previous time interval when congestion was detected.

We have set ourselves the objective with this invention to improve the solutions described above by handling the congestion more effectively in a packet switched network domain especially in an IP domain.

SUMMARY OF THE INVENTION

Accordingly, the object of the invention is a system providing congestion handling in a packet switched network domain, which domain comprises nodes that are linked to each other and transmitting data packets in the network domain. In case of congestion overload is measured, the data packets are marked to encode and signal the amount of overload, and the signalled amount of overload is stored in a core node to take into account the previously signalled overload. At least one egress node is arranged to receive marked and not marked packets, decode the overload from the marked packets in a counting interval, identify flows to be terminated and report to ingress node to reduce the traffic volume.

In another aspect, the present invention is directed to a core node comprising a storage means taking into account the previously signaled overload.

In yet another aspect, the invention refers to an egress node comprising means for adding new flows to the set of identified affected flows, means for identifying affected flows so that their aggregated load is equal to the overload value derived from the marked packets, and means for removing flows to be terminated from the set of affected flows.

In addition, the invention refers to a method for congestion handling in a packet switched network domain comprising steps of measuring overload and marking data packets to encode and signal the amount of overload; receiving marked and not marked packets; decoding the overload from the marked packets in a counting interval; identifying the flows to be terminated; sending congestion report messages to ingress nodes, and terminating the flows in at least one ingress node. The method further comprises a step of storing the signaled amount of overload taking into account the previously signaled overload.

Especially, the invention can be applied in a Differentiated Services conform IP domain.

The most important advantage of the invention is that less number of flows is terminated and so more effective link utilization is achieved.

It is also advantageous that congestion handling method according to the invention can be applied in other resource management systems, especially in which core nodes are stateless or reduced state nodes and state-full edge nodes or a state-full higher-layer application are responsible for handling a congestion situation.

BRIEF DESCRIPTION OF THE DRAWINGS

For a more complete understanding of the invention, reference is made to the following detailed description taken in conjunction with the accompanying drawings wherein.

DETAILED DESCRIPTION OF THE INVENTION

Figure 1:
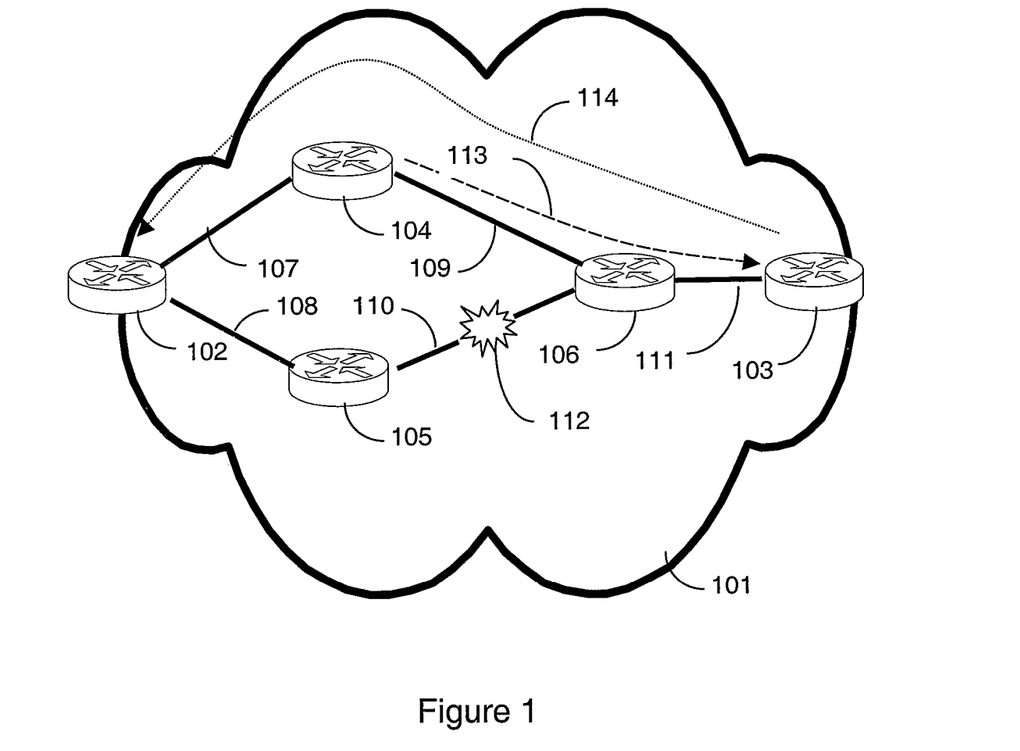
FIG. 1 is an embodiment of a domain in an IP network.

In FIG. 1 an example of a domain 101 in an IP network is illustrated. The domain 101 consists of edge nodes 102, 103 and core nodes 104, 105, 106 and links 107, 108, 109, 110, 111 between them. Ingress 102 and egress 103 nodes are edge nodes in the domain 101, handling per flow information while core nodes 104, 105, 106 store only aggregated information, typically per traffic class aggregated information. Normal operation and operation in case of loss of signaling for such a system are described for instance in A. Császár et al.: "Severe Congestion Handling with Resource Management in DiffServ on Demand", in proceedings of the Second International IFIP-TC6 Networking Conference, Networking2002, pp. 443-454, May 2002, Pisa, Italy. Here only a new congestion handling solution is discussed.

In case of link failure 112, for example, routing algorithms in IP networks will adapt by changing the routing decisions taking into account the topology and traffic volume. As a result the re-routed traffic will follow a new path, which may result in overloaded links, e.g., link 109, as they need to support more traffic than their capacity allows. This causes congestion in the communication path from which the edge nodes 102, 103 have to be notified to take appropriate counter-measures on the flow level.

Figure 2:
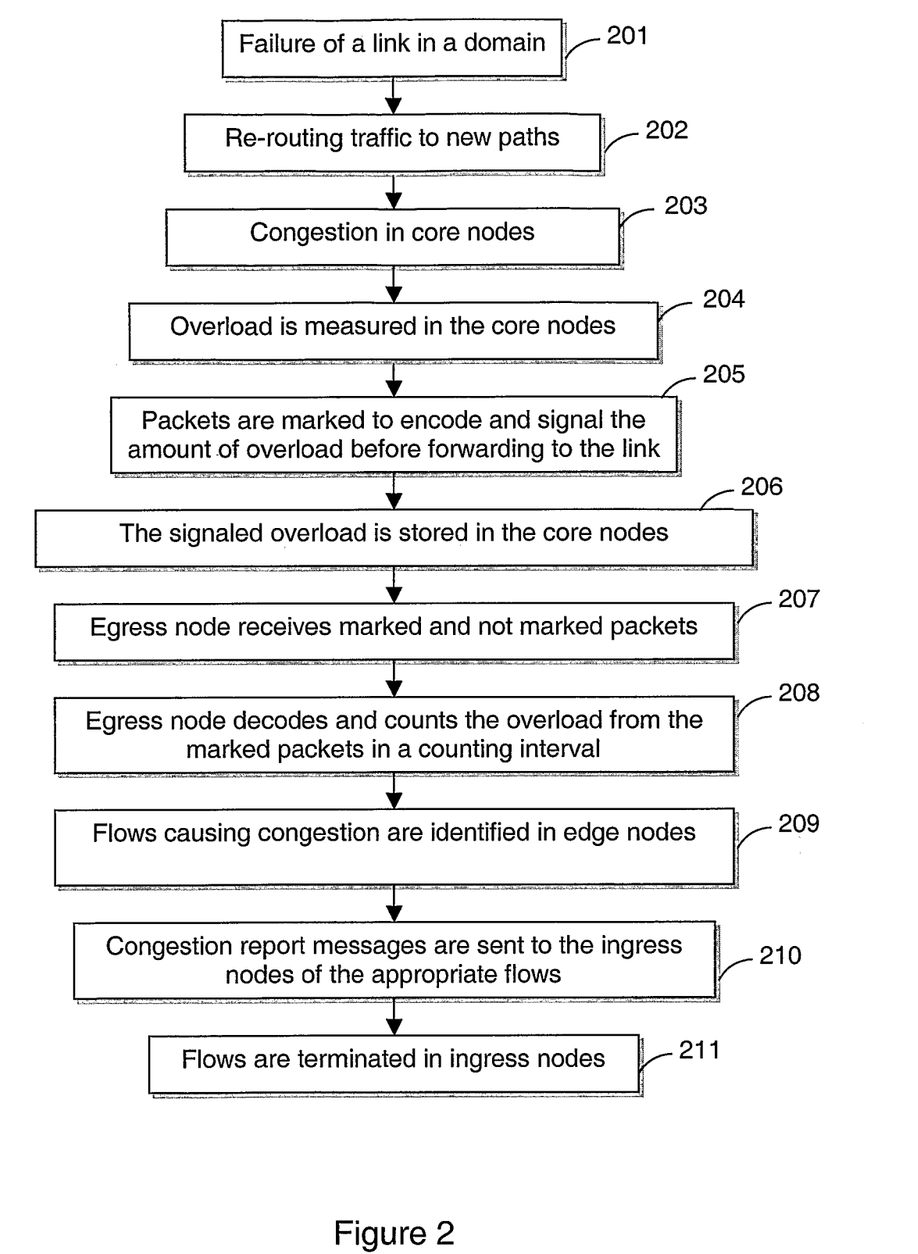
FIG. 2 is a flow chart illustrating a possible embodiment for congestion handling according to the invention.

In FIG. 2 an algorithm for handling congestion is illustrated. The steps of the algorithm are as follows: When a failure of a link occurs in a domain 201, the traffic of this link is re-routed to new paths 202, loading links on the new paths with unexpected traffic. If the volume of this additional traffic causes congestion 203 at a node, then this node measures the overload 204. Before forwarding regular data packets, some of them are marked 205. The amount of overload is encoded and signalled with packet markings. The overload value encoded in a packet could be calculated, e.g., proportional to the size of the packet or the marking of a single packet may correspond to a unit of overload. The signalled amount of overload is stored 206. After that the egress node receives 207 the marked and not marked packets (dashed line 113 in FIG. 1).

To solve the problem of over-reaction and get a more precise behaviour a kind of memory is introduced in the core nodes remembering a few measurement periods back the previously signalled overload. The time for which the storage remembers the signalled overload should be in the order of the round trip time (RTT) of the messages in the domain: e.g., the minimal, average or maximal possible RTT in the domain.

This way the amount of marked packets can be calculated by taking into account the previously signalled overload. Typically, the required overload value of marked packets at the beginning of a period is equal to the overload measured in the previous period minus the sum of already signalled overload stored in the memory.

After receiving the packets, the egress node decodes the overload value from the marked packets in a counting interval 208, and identifies the flows to be terminated 209 so that the selected flows together produced an amount of data during the counting interval that is equal (or close) to the decoded overload. The difference between the decoded overload and the load generated by the terminated flows is remembered for the next period in order to achieve a precise behaviour if during a period either more or less flows are selected to terminate than indicated from the overload. Different methods can be applied to select which flows should be terminated. For example, short- or long-life flows could be privileged, small- or high-bandwidth flows could be chosen first and so on. In a preferred embodiment the flows to be terminated are randomly selected among the flows that pass the congested link.

Anyway, the egress nodes send congestion report messages 210 (dotted line 114 in FIG. 1) back to the ingress nodes. (In FIG. 1, only one ingress node 102 is illustrated). The ingress nodes then terminate the flows 211. In an advantageous embodiment, the flows to be terminated are selected by taking into account properties of flows, e.g., lifetime, data rate, QoS requirements, etc.

Since core nodes do not store per flow information, therefore they do not know that the marked packets at the end of a measurement period belong to different flows than the ones marked in the previous period. If core nodes marked the same flows as previously, it would result in that less flows are terminated than necessary. However, the egress node has per flow information, and so remembers which flows were terminated in the previous measurement period. If marked packets arrive for a flow terminated in the previous measurement period, termination will be decided for other flows, if the egress node knows which other flows it can choose from; that is, if the egress node knows which other flows passed the congested link.

The egress node can obtain the information of which flows passed the congested node from the routing protocol but the hop-by-hop routing scheme of today's networks aims right at distributed knowledge. In order to provide a mechanism to identify the flows traversing through the congested node without relying on external protocols an enhanced, at least 3-state stamping procedure of the interior node can be used instead of the original 2-state stamping.

Packets that are carrying encoded overload information are called 'marked' packets. In an advantageous embodiment packets that passed a congested link but are not marked are also stamped with a flag: 'congested but not marked'. Trivially, the $3^{rd}$ state is if the packet is 'not marked'. The stamping can be done with the help of two bits in the packet header, e.g., the Explicit Congestion Notification (ECN) bits (described in RFC 2481), or by separating two bits from the DSCP. Another solution is if the network operator locally assigns for every traffic class two other DSCPs, which are interpreted at its egress nodes as marked or congested but not marked stamps. In this way, the egress node knows that those packets traversed the congested link that were stamped either with 'congested but not marked' or with 'marked'. The egress node should select the appropriate number of flows to terminate, as described above, from those flows that received either 'marked' or 'congested but not marked' packets.

A preferred embodiment ensures that multiple simultaneous congestions on several links can be distinguished. To ensure the proper and efficient handling of congestions the stamping procedure is extended with some kind of an identifier of the congested link. Each packet, 'marked' or 'congested but not marked', is stamped with an identification code that is unique for that particular congestion. Such unique identification code could be the node identifiers (IDS) of nodes connected by the congested link or a random value (large enough to retain uniqueness) derived independently from other nodes.

Another preferred embodiment ensures that in case of variable traffic, the variability will not trigger multiple congestions in the core node. For example, the bandwidth variation of the Variable Bit Rate (VBR) traffic is around 10% of the link capacity. This means that if, after congestion, precisely the maximum possible amount of flows remains, then the variable traffic after some time would again exceed the congestion detection threshold. Therefore, hysteresis should be applied for the overload detection threshold. Our hysteresis algorithm has two bounds. A higher bound is used to detect congestion and to trigger the appropriate counter-reaction. This reaction consists of marking data packets in proportion to the measured overload. However, a lower bound is used as the reference to measure the overload ratio. This way, in an ideal case, the congestion reaction terminates the amount of flows so that only lower bound amount of traffic remains. If the traffic variability is smaller than the difference of the higher and the lower bound, then it will not trigger congestion again.

Figure 3:
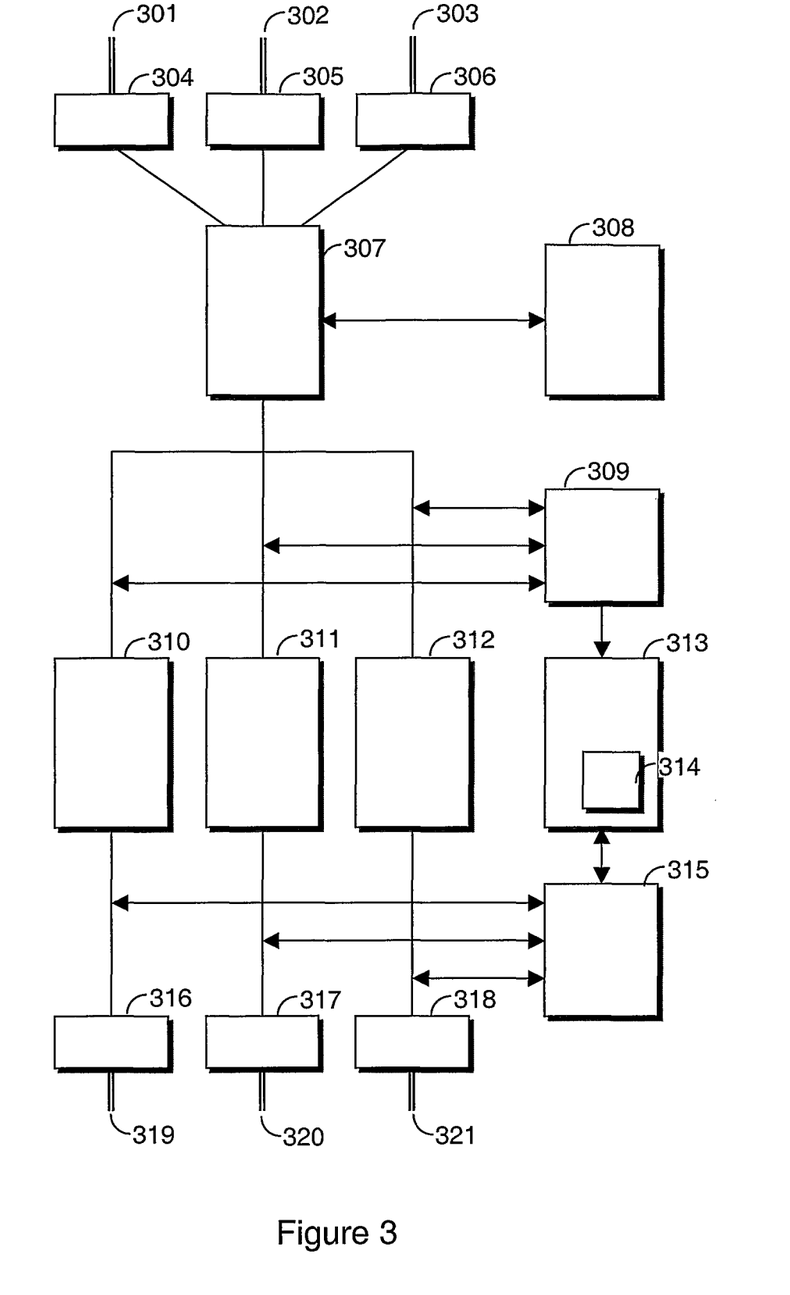
FIG. 3 illustrates an embodiment of a core node according to the invention.

In FIG. 3 an embodiment of a core node, e.g., 104 in FIG. 1, handling simple resource management information is illustrated. Incoming interfaces 304, 305, 306 are connected to links 301, 302, 303 one of which can be identical for example to link 109 in FIG. 1. A routing module 307 is attached to the incoming interfaces 304, 305, 306, to a routing table 308 and to queues 310, 311, 312. A measurement module 309 communicates the queues 310, 311, 312 and a module of congestion handling 313 containing a storage means 314. The queues 310, 311, 312 are further connected to outgoing interfaces 316, 317, 318 and a marker module 315, receiving information from the module of congestion handling 313. The outgoing interfaces 316, 317, 318 forward packets to outgoing links 319, 320, 321, one of which can be identical to link 111 in FIG. 1.

Up to the route selection, the node is just a simple router. The first addition is the measurement module 309, which is used to detect and measure overload. In periodical intervals it communicates the measured overload for each link 301, 302, 303 to the module of congestion handling 313. With the previously explained procedure, the module of congestion handling 313 determines the amount of overload to signal in the current period and communicates this to the marker module 315. The marker module 315 marks packets accordingly and applies advantageously the hysteresis algorithm described before, and at the end of the period tells the module of congestion handling 313 the amount of signalled overload by a 3-state stamping procedure that encodes overload information and identifies the flows that passed a congested link but are not carrying encoded overload information. As described previously, with the help of this information and the measured overload in the new period, the module of congestion handling 313 determines how much of the overload should be signalled next.

E.g., let us denote the extent of overload during the measuring period by $C_{OL}$, and the extent of overload identified previously by $C_{MEM}$. $C_{MEM}$ is stored in the storage means 314. If $C_{MEM}$ is stored in a sliding window, then at the end of the $i^{th}$ measurement period $C_{MEM}$ is equal to $A_i$ (see FIG. 6). The extent of overload for the next period to be identified is equal to the difference of $C_{OL}$ and $C_{MEM}$, which can be denoted by C. If this difference is less than zero, then nothing should be done. If it is a positive number, then let $C_M$ represent the thus far signalled overload in the current period. Marking of packets shall be continued until the measure of $C_M$ exceeds C. Further on marking should be stopped and $C_M$ is stored in the storage means 314.

Figure 4:
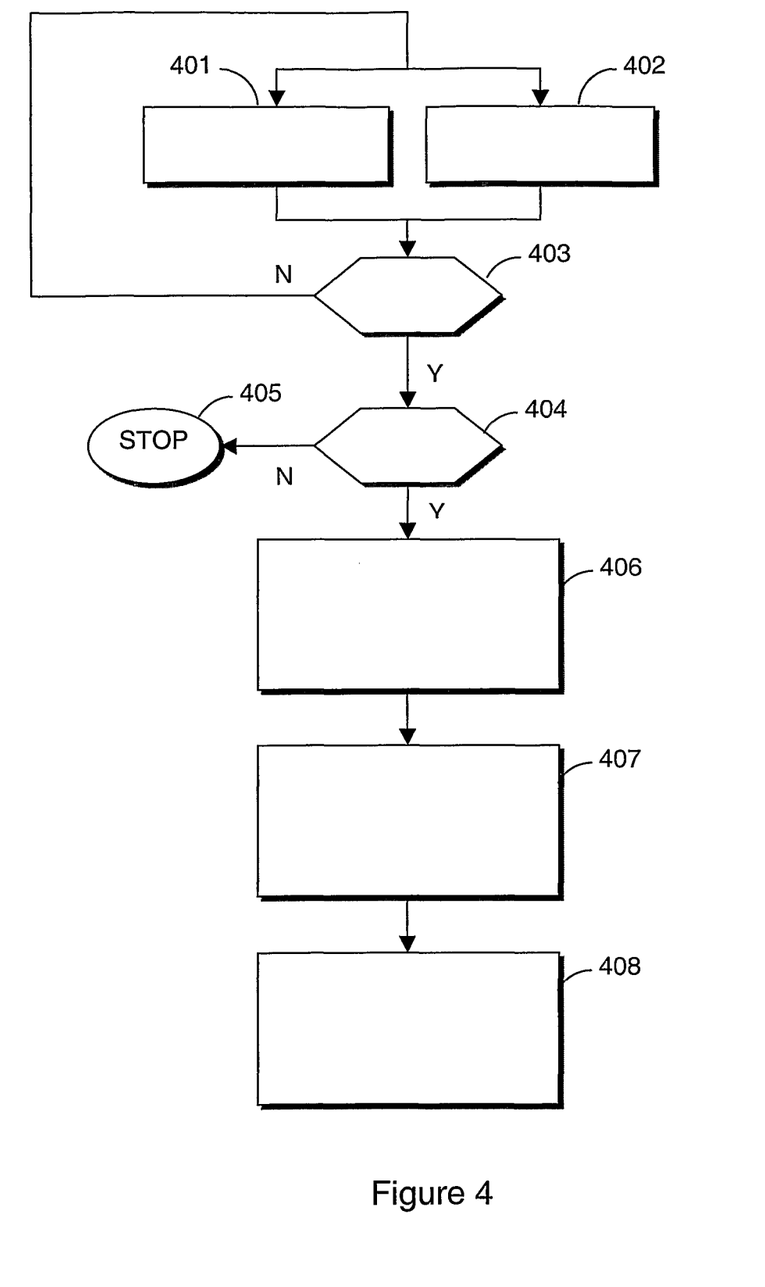
FIG. 4 shows the flow chart of the operation of a possible egress node according to the invention.

In FIG. 4, a flow chart of the operation of a possible egress node according to the invention is described. According to step 401 a counter is incremented with the decoded overload value of received marked packets. As it is described above, $C_M$ represents the measure of the overload. In step 402 packets 'congested but not marked' are identified and flows containing packets 'marked' or 'congested but not marked' are identified as affected flows. Assume, that an affected flow is denoted by $f_i$, and a set of such flows can be denoted by S. A new affected flow $f_i$ is added to set S if it has not been element of S previously and $f_i$ receives a 'marked' or 'congested but not marked' packet. The condition of step 403 is decided if a period of observation is over. If the period is not over, steps 401 and 402 are repeated. In step 404 $C_M$ is decided to exceed zero or not. If not, then nothing should be done 405. If $C_M$ is greater than zero, then in step 406 some affected flows are identified so that these flows should generate together traffic equal to $C_M$. Let $b_i$ denote the traffic generated by flow i, and let T denote the set of identified flows. It is obvious that set T is part of set S. If b denotes the sum of $b_i$, i.e., traffic generated by the identified flows, then b should approximate to $C_M$, and the current value of $C_M$ is set to the amount of $C_M$ counted previously minus b. In step 407 congestion report messages are sent for all identified affected flows to be terminated. Finally, according to step 408, flows to be terminated are removed from set S.

Steps described above can be implemented by processing means in an edge node. E.g., an egress node having means for decoding the overload from marked packets; identifying packets that are carrying encoded overload information and packets that passed a congested link not carrying encoded overload information; adding new flows to the set of affected flows; identifying affected flows so that their aggregated load is equal to the overload value derived from the marked packets; sending messages for a set of identified affected flows to be terminated; and removing flows to be terminated from the set of affected flows. In the case when some or all the steps described above are implemented in an ingress node means for signalling the necessary information from egress nodes is also required.

Figure 5:
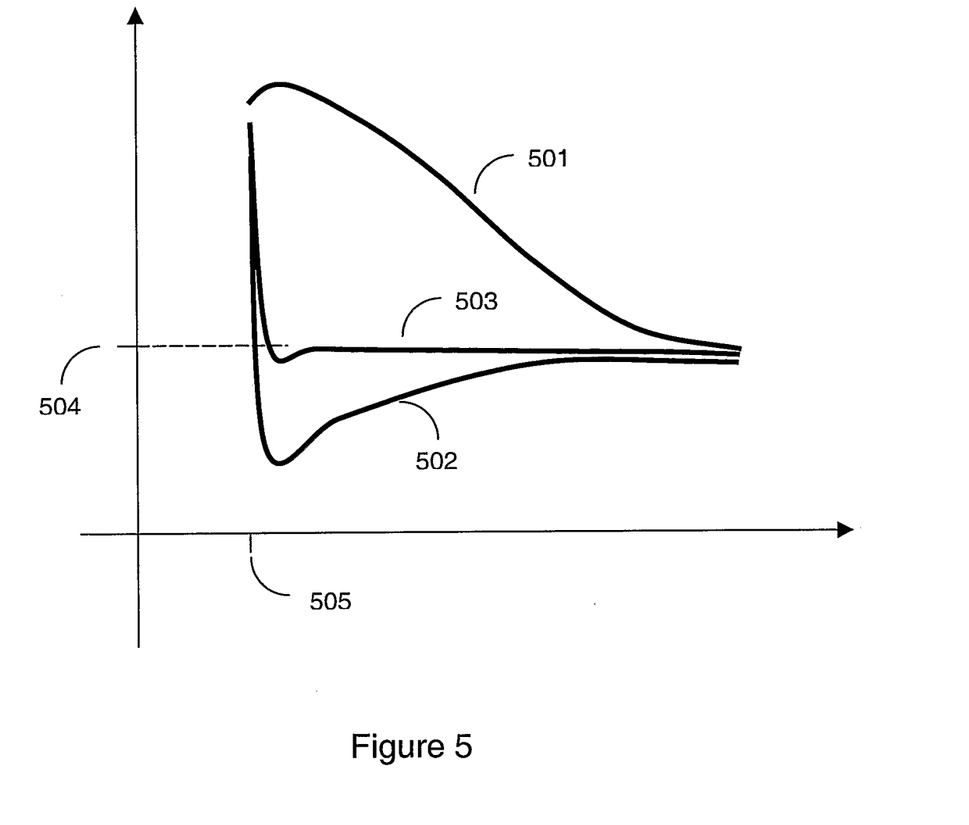
FIG. 5 depicts a graph of a network simulation for congestion.

In FIG. 5, a graph of network simulation is shown, illustrating the overload of the link capacity (vertical axis) in the function of time (horizontal axis) after a congestion event 505. The first curve 501 relates to the case where no congestion handling is applied. As it is seen, the link overload remains high in time until it returns to the CAC threshold 504. The second curve 502 shows the effect of a congestion handling according to the prior art. After the congestion the algorithm over-reacts the event and an 'undershoot' can be seen. The third curve 503 illustrates the usage of the invention. In this case the link overload returns to the normal level after the congestion without heavy undershoot.

Figure 6:
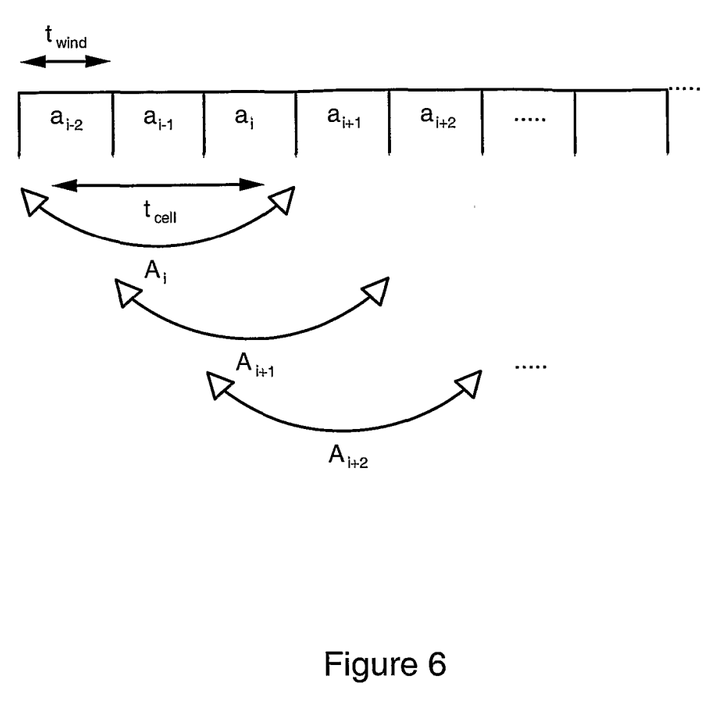
FIG. 6 illustrates an example for method of sliding window.

FIG. 6 shows an advantageous embodiment of the storage means 314 with the help of a method of sliding window. The $t_{cell}$ long measurement periods are gathered into a $t_{wind}$ long sliding window so that $t_{wind}=(k\ t_{cell})$, and where $t_{wind}$ is in the order of the round trip times as explained above. In the implementation we always have to store the sum of the signalled overload in the last k measurement periods so that at the end of timeslot i the sliding window contains $(a_{i-k+1}, \ldots, a_{i-1}, a_i)$, and where the sum of these values represent the remembered amount of previous markings:

$$A_i = \sum_{j=i-k+1}^{i} a_j.$$

At the end of a measurement period, the sliding window is shifted so that the value of the oldest cell is overwritten with the newest value.

Although preferred embodiments of the present invention have been illustrated in the accompanying drawings and described in the foregoing detailed description, it is understood that the invention is not limited to the embodiments disclosed, but is capable of numerous rearrangements, modifications, and substitutions without departing from the spirit of the invention as set forth and defined by the following claims.

What is claimed is:

1. A system for handling congestion in a packet switched network domain comprising nodes, which are linked to each other transmitting data packets in the network domain, the system comprising:

a core node for measuring overload, to mark data packets where an amount of overload is encoded and signaled with packet markings; and an egress node for receiving from the core node marked and not marked packets, decode the overload amount from the marked packets in a counting interval, identify flows to be terminated and report to ingress node to reduce the traffic volume, wherein the core node is arranged to calculate an amount of marked packets by taking in account a previously signaled overload amount, where the core node implements an at least 3-state stamping procedure to encode the overload amount by marked packets, congested but not marked packets and not marked packets and to identify flows that passed a congested link but are not marked, where the core node itself applies three-flags to stamp the data packets where one flag indicating "marked packets" is stamped to the data packets traversing a congested link and marked, another flag indicating "congested but not marked packets" is stamped to the data packets traversing a congested link but not marked and a third flag indicating "not marked packets" is stamped to the data packets traversing not congested links; and where the egress node is arranged to remember which flows were terminated in a previous measurement period so that when marked packets are received for a flow that was terminated in the previous measurement period then another flow associated with congested but not marked packets or marked packets is selected to be terminated where the another flow is selected based on at least 3-state stamping information received from the core node that identifies the congested but not marked packets, marked packets, and not marked packets.

2. The system of claim 1, wherein the packet switched network domain is an Internet Protocol (IP) domain.

3. The system of claim 1, wherein the core node is arranged to apply a hysteresis algorithm with a higher bound used to detect congestion and to trigger the marking of data packets in proportion to the measured overload amount, and a lower bound used as the reference to measure an overload ratio.

4. A method implemented by a system for congestion handling in a packet switched network domain comprising nodes, which are linked to each other transmitting data packets in the network domain, the method comprising the steps of:

measuring, in a core node, overload and marking data packets where an amount of overload is encoded and signaled with packet markings;

calculating, in the core node, an amount of marked packets by taking in account a previously signaled overload amount;

implementing in the core node an at least 3-state stamping procedure to encode the overload amount by marked packets, congested but not marked packets and not marked packets and to identify flows that passed a congested link but are not marked, where the core node itself applies three-flags to stamp the data packets where one flag indicating "marked packets" is stamped to the data packets traversing a congested link and marked, another flag indicating "congested but not marked packets" is stamped to the data packets traversing a congested link but not marked and a third flag indicating "not marked packets" is stamped to the data packets traversing not congested links;

receiving from the core node marked and not marked packets in an egress node;

decoding in the egress node the overload amount from the marked packets in a counting interval;

identifying flows to be terminated in the egress node, wherein the egress node is arranged to remember which flows were terminated in a previous measurement period so that when marked packets are received for a flow that was terminated in the previous measurement period then another flow associated with congested but not marked packets or marked packets is selected to be terminated where the another flow is selected based on at least 3-state stamping information received from the core node that identifies the congested but not marked packets, marked packets, and not marked packets, and reports to an ingress node to reduce the traffic volume; and sending congestion report messages from the egress node to ingress nodes;

terminating the identified flows in at least one ingress node.

5. The method of claim 4, further comprising a step of storing the previously signaled amount of overload by sliding windows.

6. The method of claim 4, wherein the step of identifying the flows to be terminated is carried out by selecting flows different from the flows terminated before.

7. The method of claim 4, wherein the step of terminating flows in at least one ingress node further comprises the flows to be terminated are randomly selected among the flows that pass a congested node.

8. The method of claim 4, wherein the step of marking data packets to encode and signal the amount of overload applies a hysteresis algorithm with a higher bound used to detect congestion and to trigger marking data packets in proportion to the measured overload amount, and a lower bound used as the reference to measure an overload ratio.

* * * * *

UNITED STATES PATENT AND TRADEMARK OFFICE
CERTIFICATE OF CORRECTION

PATENT NO. : 8,446,826 B2  
APPLICATION NO. : 11/718854  
DATED : May 21, 2013  
INVENTOR(S) : Csaszar et al.

Page 1 of 1

It is certified that error appears in the above-identified patent and that said Letters Patent is hereby corrected as shown below:

In the Specification

In Column 5, Line 57, delete "(IDS)" and insert -- (IDs) --, therefor.

Signed and Sealed this
Twenty-fourth Day of September, 2013

Teresa Stanek Rea
*Deputy Director of the United States Patent and Trademark Office*